(12) United States Patent
Cabral et al.

(10) Patent No.: US 10,109,264 B2
(45) Date of Patent: Oct. 23, 2018

(54) COMPOSING MUSIC USING FORESIGHT AND PLANNING

(71) Applicant: International Business Machines Corporation, Armonk, NY (US)

(72) Inventors: Alyson T. Cabral, Austin, TX (US);
Richard B. Daskas, Austin, TX (US);
Christopher M. Durham, Round Rock, TX (US); Janani Mukundan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/634,766

(22) Filed: Jun. 27, 2017

(65) Prior Publication Data
US 2017/0358285 A1    Dec. 14, 2017

Related U.S. Application Data

(63) Continuation of application No. 15/179,055, filed on Jun. 10, 2016, now Pat. No. 9,799,312.

(51) Int. Cl.
*A63H 5/00* (2006.01)
*G04B 13/00* (2006.01)
*G10H 1/00* (2006.01)

(52) U.S. Cl.
CPC ..... *G10H 1/0025* (2013.01); *G10H 2210/105* (2013.01); *G10H 2210/111* (2013.01); *G10H 2240/085* (2013.01)

(58) Field of Classification Search
CPC .. G10H 2220/015; G10H 1/0025; G10H 1/00; G10H 2210/111; G10H 2240/131; G10H 2210/105; G10H 2240/155; G10H 2250/471; G10G 1/00
See application file for complete search history.

(56) References Cited

U.S. PATENT DOCUMENTS

| | | | |
|---|---|---|---|
| 6,740,802 B1 * | 5/2004 | Browne, Jr. | G10H 1/0025 84/609 |
| 7,732,697 B1 * | 6/2010 | Wieder | G10H 1/0025 84/609 |
| 7,884,274 B1 * | 2/2011 | Wieder | G06F 17/30772 360/55 |
| 9,799,312 B1 * | 10/2017 | Cabral | G10H 1/0025 |

(Continued)

OTHER PUBLICATIONS

Collins, "Reinforcement Learning for Live Musical Agents," Proceedings of the International Computer Music Conference, Jul. 2008, 8 pages.

(Continued)

*Primary Examiner* — Marlon Fletcher
(74) *Attorney, Agent, or Firm* — VanLeeuwen & VanLeeuwen; Mercedes L. Hobson

(57) ABSTRACT

An approach is provided in which an information handling system configures a reinforcement learning model based inspiration selections received from a user. The information handling system performs training iterations using the configured reinforcement learning model, which generates multiple actions and multiple rewards corresponding to multiple actions. The information handling system determines that the multiple rewards reach an empirical threshold and, in turn, generates a musical composition based on the multiple actions.

25 Claims, 12 Drawing Sheets

(56) References Cited

U.S. PATENT DOCUMENTS

| | | | | |
|---|---|---|---|---|
| 2007/0119288 | A1* | 5/2007 | Makino | G10H 1/0041 84/602 |
| 2007/0227339 | A1 | 10/2007 | Suriano | |
| 2015/0033932 | A1* | 2/2015 | Balassanian | G06F 17/30778 84/609 |
| 2015/0179157 | A1* | 6/2015 | Chon | G10H 1/0066 84/645 |
| 2016/0379611 | A1* | 12/2016 | Georges | G10H 1/0025 84/613 |

OTHER PUBLICATIONS

Fernandez et al., "AI Methods in Algorithmic Composition: A Comprehensive Survey," Journal of Artificial Intelligence Research 48 (2013), Nov. 2013, pp. 513-582.

Franklin et al., "Nonlinear Credit Assignment for Musical Sequences," Proceedings of the Second international workshop on Intelligent systems design and application, Atlanta, Georgia, Aug. 2002, pp. 245-250.

Groux et al., "Towards Adaptive Generation by Reinforcement Learning of Musical Tension," 2010, 7 pages.

Lopez De Mantaras, "Making Music with AI: Some examples," Proceedings of the 2006 conference on Rob Milne: A Tribute to a Pioneering AI Scientist, Entrepreneur and Mountaineer, 2006, pp. 90-100.

Reese, "Computationally generated music using reinforcement learning," Electronic Theses and Dissertations, University of Louisville, May 2011, 148 pages.

Phon-Amnuaisuk, "Generating Tonal Counterpoint using Reinforcement Learning," Neural Information Processing, vol. 5863 of the series Lecture Notes in Computer Science, 16th International Conference, ICONIP 2009, Bangkok, Thailand, Dec. 1-5, 2009, Proceedings, Part I, pp. 580-589.

Smith et al., "The Education of the AI Composer: Automating Musical Creativity," National Center for Supercomputing Applications, Mar. 2012, 4 pages.

Cont et al., "Anticipatory Model of Musical Style Imitation using Collaborative and Competitive Reinforcement Learning," Anticipatory Behavior in Adaptive Learning Systems, Springer-Verlag Berlin, Heidelberg, 2007, pp. 285-306.

"List of IBM Patents or Patent Applications Treated as Related," Letter from Leslie A. Van Leeuwen, Jun. 27, 2017, 1 page.

Cabral et al., "Composing Music Using Foresight and Planning," U.S. Appl. No. 15/179,055, filed Jun. 10, 2016, 51 pages.

\* cited by examiner

| INSPIRATION KNOB | INSPIRATION KNOB SELECTION | MUSICAL CHARACTERISTICS |
|---|---|---|
| Artist Musical Signature (AMS) Knob | Tupac | Minor Scale<br>Rest Notes<br>Syncopation |
| | Taylor Swift | G Major<br>Mostly Guitar Chords<br>No Syncopation |
| | ... | ... |
| Emotion Knob | Mysterious | Octatonic scale<br>Instrumentation |
| | Joy | Major Chords<br>Faster Rhythm (1/8th or 1/16 notes)<br>Instrumentation |
| | ... | ... |
| Genre Knob | Jazz | 7th chords<br>Chromatics |
| | Classical | PLEASE FILL IN |
| | ... | ... |
| Structure Knob | Simple | Bass only plays home notes<br>8th or 16th beat rhythm<br>Melody only uses pentatonic scale |
| | Complex | Bass borrows from other scales<br>Rhythm is syncopated<br>Melody borrows from other |
| | ... | ... |
| Theme Knob | Western | Instrumentation |
| | Middle Eastern | Various Middle Eastern scales<br>Instrumentation |
| | ... | ... |

*Fig. 5*

COMPOSING MUSIC USING FORESIGHT AND PLANNING

BACKGROUND

Musical compositions are typically based on fundamental elements of music such as pitch, rhythm, melody, harmony, and form. Composing music requires a composer to contemplate and create melodies, create chord progressions to support the melodies, write countermelodies, write musical notation, and other tasks to generate a final musical composition. A musical composition may be created by a single composer or by multiple composers working together, such as by several individuals in a band that collaborate to compose music.

BRIEF SUMMARY

According to one embodiment of the present disclosure, an approach is provided in which an information handling system configures a reinforcement learning model based inspiration selections received from a user. The information handling system performs training iterations using the configured reinforcement learning model, which generates multiple actions and multiple rewards corresponding to multiple actions. The information handling system determines that the multiple rewards reach an empirical threshold and, in turn, generates a musical composition based on the multiple actions.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is an exemplary diagram depicting musical characteristics corresponding to inspiration knob selections that the artist inspiration tool utilizes to configure a reward structure of the artist inspiration tool's reinforcement learning model;

DETAILED DESCRIPTION

Figure 1:
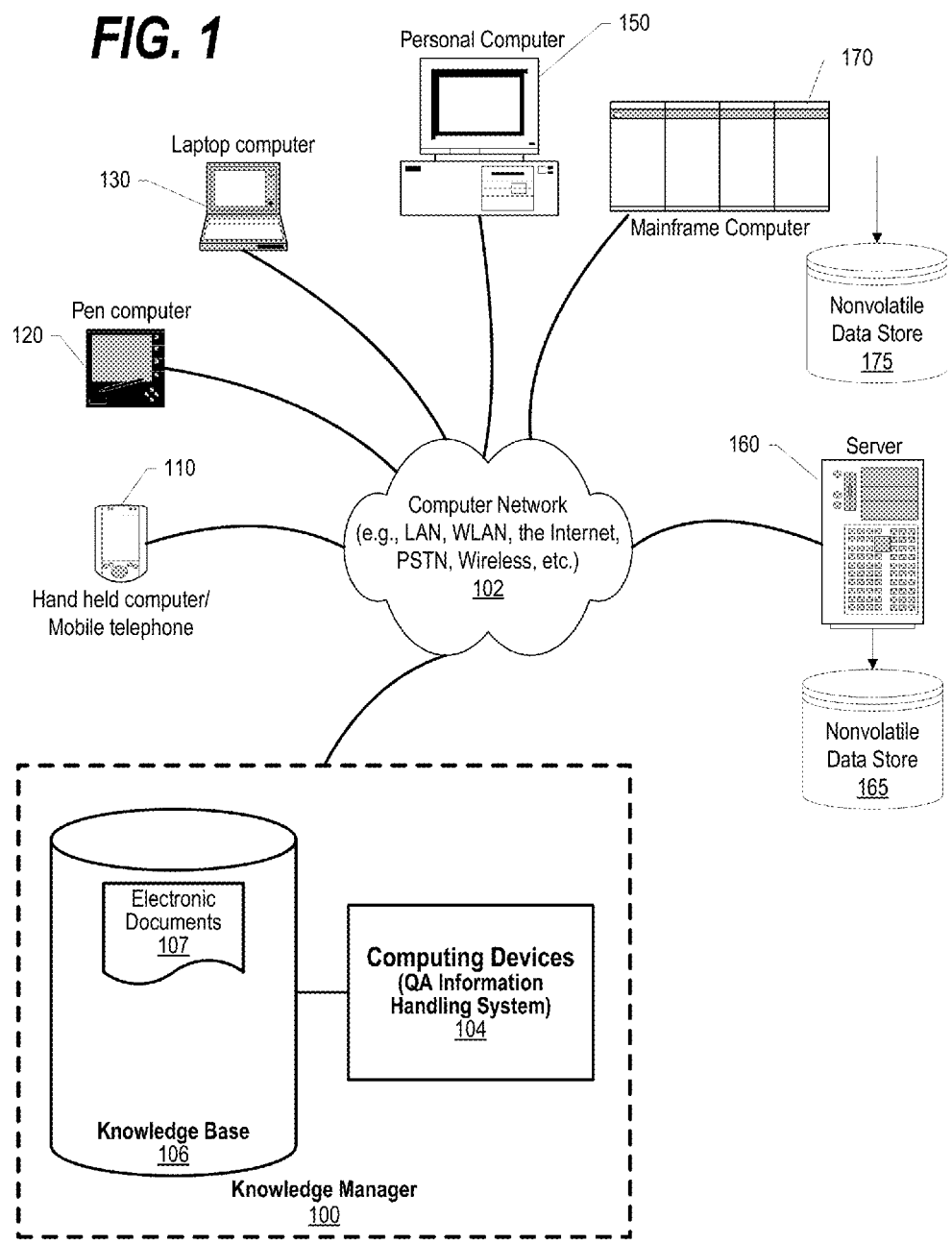
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, possible answer-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing possible answer information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 107 or other data, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with knowledge manager 100. The document 107 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
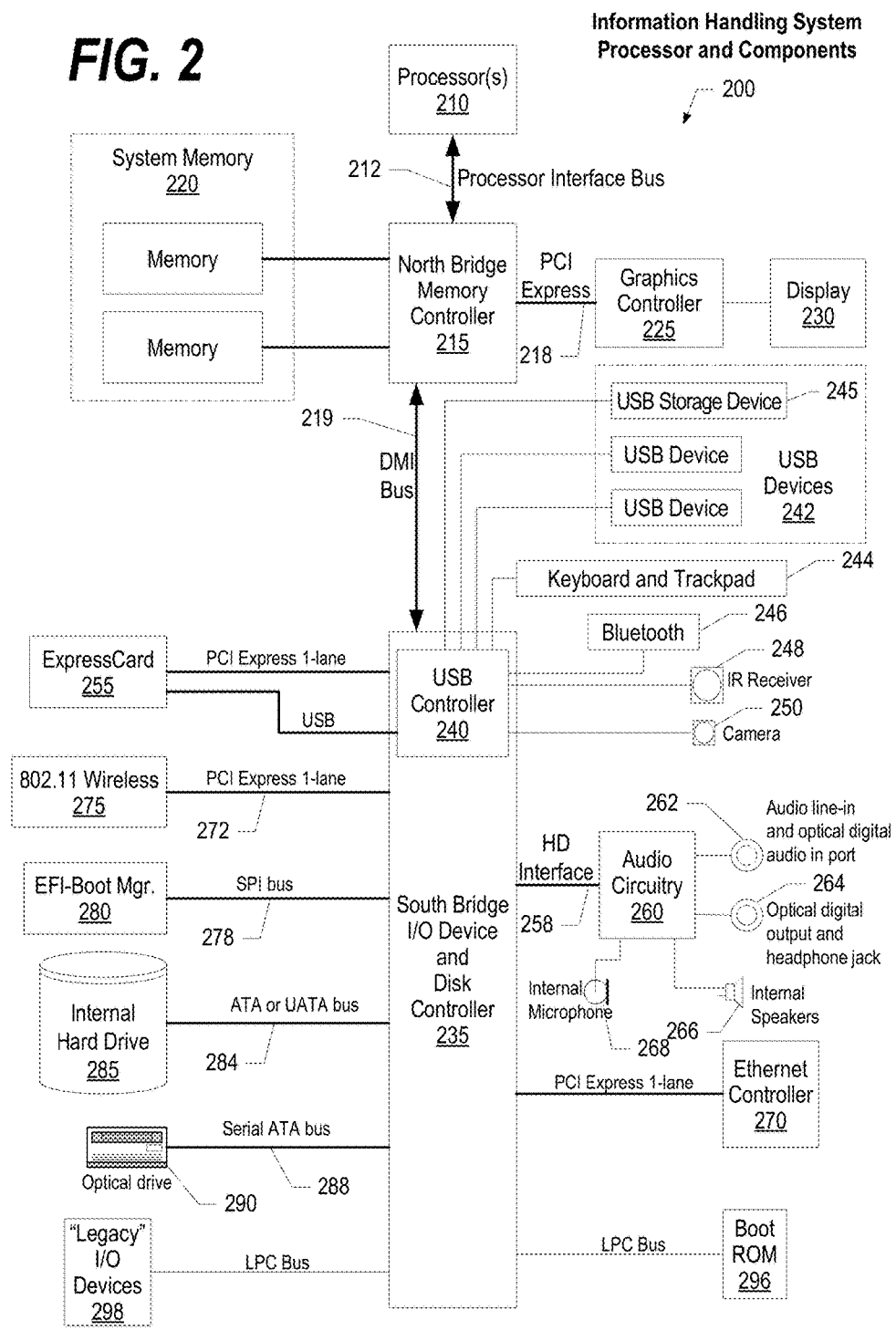
FIG. 2 illustrates an information handling system, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-12 depict an approach that can be executed on an information handling system. The information handling system includes an artist inspiration tool that receives inspiration requests and generates new musical compositions. The request includes a user's inspiration selections, also referred to herein as inspiration knob selections, which may include one or a combination of inspiration knob selections such as an artist musical signature knob selection, an emotion knob selection, a genre knob selection, a structure knob selection, a theme knob selection, or other inspiration knob selections requested by the user. The artist inspiration tool identifies musical characteristics corresponding to the inspiration knob selections and configures a reward structure of a reinforcement learning model based on the musical characteristics. The artist inspiration tool proceeds through a series of iterations using the reinforcement learning model until the musical composition reaches an empirical threshold. Once the empirical threshold is reached, the artist inspiration tool provides the musical composition to the user. In one embodiment, the artist inspiration tool receives feedback from the user of the musical composition and adjusts the reinforcement learning model's reward structure based on the user feedback. The artist inspiration tool then generates a subsequent musical composition using the adjusted reinforcement learning model.

Figure 3:
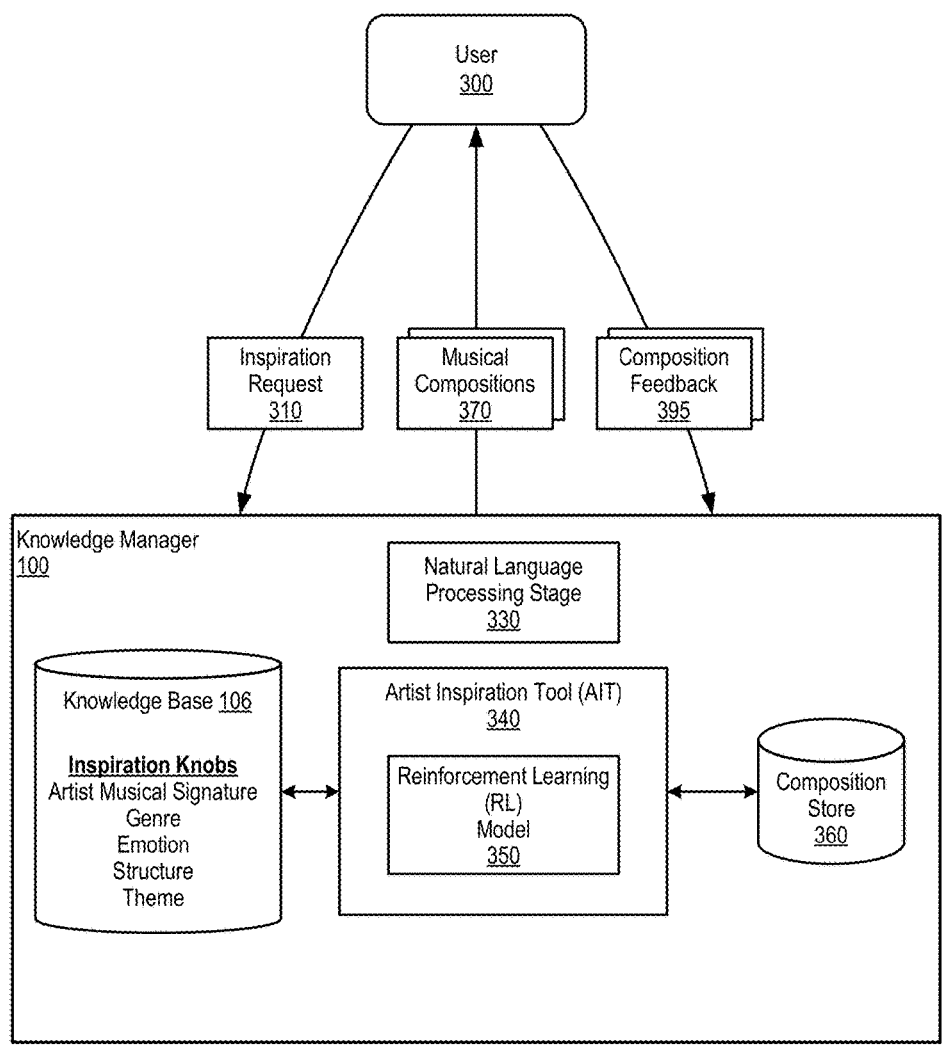
FIG. 3 is an exemplary diagram depicting an artist inspiration tool that receives inspiration requests and generates new musical compositions based upon the inspiration requests and user-provided feedback.

FIG. 3 is an exemplary diagram depicting an artist inspiration tool that receives inspiration requests and generates new musical compositions based upon the inspiration requests and user-provided feedback. Knowledge manager 100 includes artist inspiration tool 340. Artist inspiration tool 340 generates musical compositions based on "inspiration knob selections" from user 300. As discussed in detail below, a user makes selections from one or a combination of inspiration knobs such as an artist musical signature knob, an emotion knob, a genre knob, a structure knob, and a theme knob. For example, artist inspiration tool 340 may provide a user interface to user 300 showing inspiration knobs for user 300 to select. In another example, inspiration request 310 may corresponds to user 300 speaking the phrase "Create a Tupac inspired track with a Jazz Genre, a mysterious emotion, a complex structure, and a Western theme" into the user's cell phone microphone. In this example, natural language processing stage 330 analyzes the phrase and determines user 300's inspiration knob selections (see FIG. 7 and corresponding text for further details).

Artist inspiration tool 340 then identifies musical characteristics of the determined inspiration knob selections. In one embodiment, artist inspiration tool 340 retrieves the corresponding musical characteristics from knowledge base 106. In this embodiment, knowledge base 106 may include a table of inspiration knob selections and their corresponding musical characteristics, such as table 500 shown in FIG. 5. In another embodiment, artist inspiration tool 340 and knowledge manager 100 may access a computer network such as the Internet to determine musical characteristic of an inspiration knob selection. For example, an inspiration knob selection may be a theme knob of "Western movie" and knowledge manager 100 accesses western movies to analyze music played in the movies to determine their corresponding musical characteristics.

Figure 8:
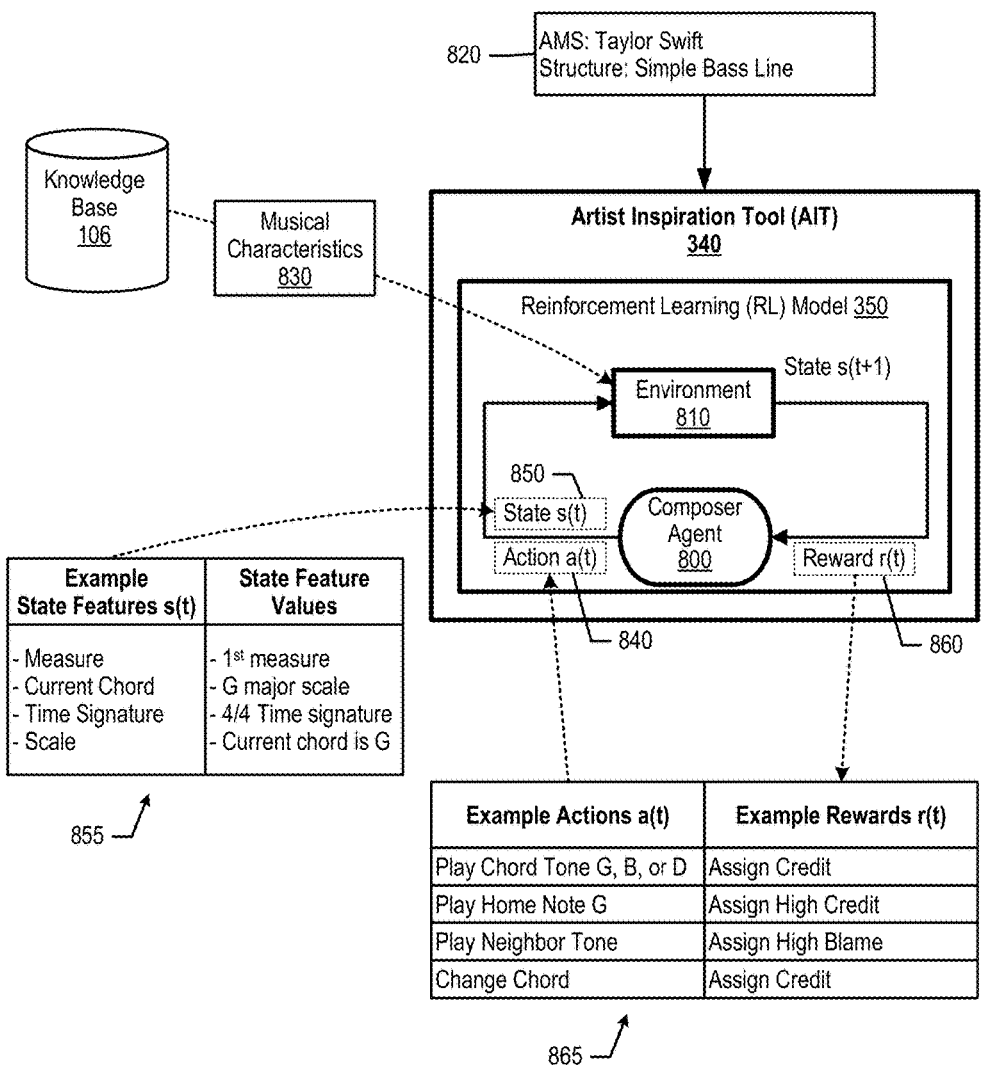
FIG. 8 is an exemplary diagram depicting the artist inspiration tool's reinforcement learning model.

Artist inspiration tool 340 then configures a reward structure of reinforcement learning model 350 using the identified musical characteristics. Referring to FIG. 8, artist inspiration tool 340 configures environment 810 by loading musical characteristics 820 into environment 810, causing environment 810 to provide rewards to composer agent 800 based evaluating composer agent's actions against the loaded musical characteristics.

Artist inspiration tool 340 generates a musical composition using reinforcement learning model 350 and provides musical composition 370 to user 300. In one embodiment, artist inspiration tool 340 also stores the musical composition in composition store 360 for subsequent retrieval and analysis.

User 300 listens to musical composition 370 and provides feedback 395 to knowledge manager 100. In one embodiment, the user's feedback is at the musical composition level, such as the user liking or disliking the entire musical composition. In another embodiment, the user's feedback may be a musical composition partition level, such as the user liking or disliking the $4^{th}$ measure in the musical composition (see FIG. 9 and corresponding text for further details).

Artist inspiration tool 350 analyzes composition feedback 395 and adjusts the reward structure of reinforcement learning model 350 accordingly. Artist inspiration tool 350 then creates another musical composition using the adjusted reinforcement learning model 350. For example, composition feedback 395 may indicate that user 300 liked the mood and pitch of the first musical composition but did not like the key of the first musical composition. In this example, artist inspiration tool 340 adjusts the musical characteristics in reinforcement learning model 350 corresponding to the key (e.g., G to C) and generates a new musical composition.

Figure 10:
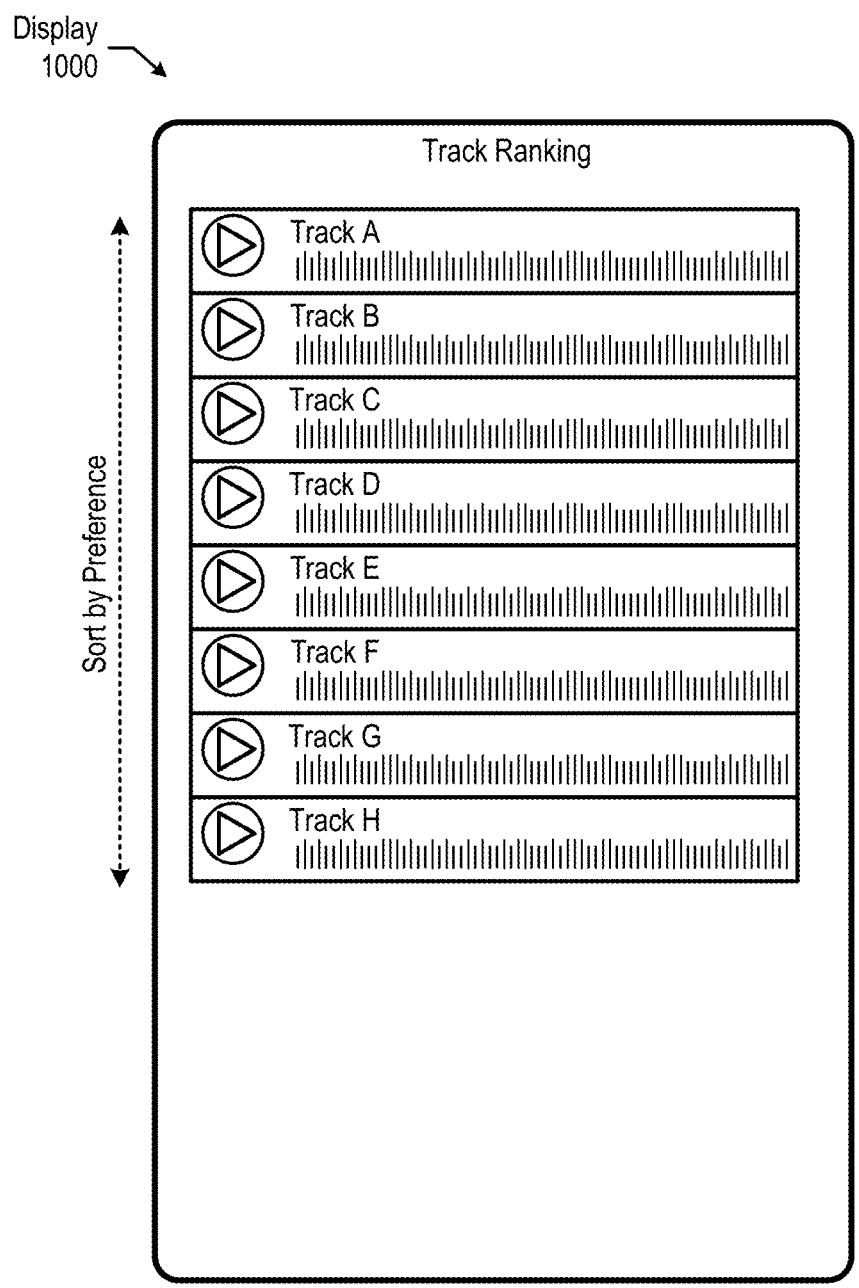
FIG. 10 is an exemplary diagram depicting a user interface window that allows a user to rank various musical compositions.

When user 300 informs artist inspiration tool that enough musical compositions 370 have been received, artist inspiration tool 340 may provide user 300 with a user interface to rank the musical compositions (see FIG. 10 and corresponding text for further details). In one embodiment, artist inspiration tool 340 stores the musical compositions with user 300's composition feedback 395 in composition store 360 for subsequent understanding of user 300's preferences in subsequent inspiration request 310.

Figure 4:
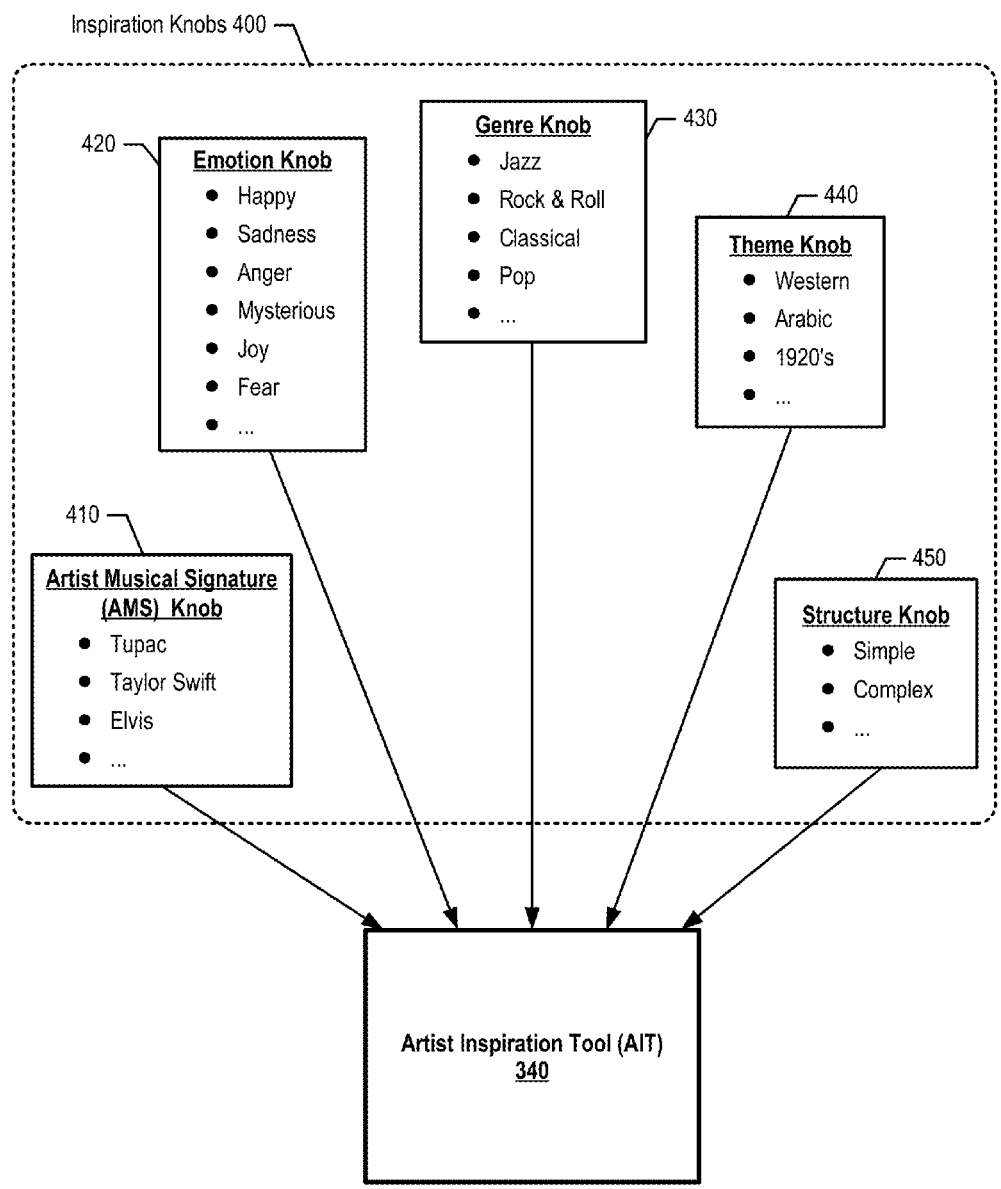
FIG. 4 is an exemplary diagram depicting various inspiration knob selections.

FIG. 4 is an exemplary diagram depicting various inspiration knob selections, also referred to herein as inspiration selections. User 300 may utilize several inspiration knobs to create an original musical composition. As discussed earlier, user 300 may make inspiration knob selections using a user interface on a display or the user may speak the user's request in a natural language. FIG. 4 shows examples of inspiration knobs 400 and corresponding inspiration knob selections. As those skilled in the art can appreciate, a user may have more or less selection that what is shown in FIG. 4.

Artist musical signature knob 410 includes a list of artists that have created music. Each artist has a particular signature, some of which are readily apparent. In one embodiment, user 300 may select from a list of artists. In another embodiment, user 300 may speak an artist's name and knowledge manager in conjunction with artist inspiration tool 340 search the Internet to evaluate the artist's existing songs and determine a musical signature of the artist.

Emotion knob 420 allows a user to specify a particular emotion as a main overlay to a musical composition. For example, the user may say "Generate a Taylor Swift inspired track with a fearful emotion." In this example, artist inspiration tool 340 combines musical characteristics corresponding to Taylor Swift's musical signature with musical characteristics corresponding to a fearful emotion. The musical signature of an artist such as Taylor Swift includes several guitar chords, mostly composed in G-Major, has no syncopation, and the melody generally relies on a pentatonic scale for a particular key. Emotions such as fear and mystery may be incorporated using octatonic scales and/or using particular types of instrumentation such as strings and bells. As such, the two sets of musical characteristics may be combined to use a reward structure that allows movement between measures from a G-Major scale to octatonic scales while preferring chords that may be easily played using a guitar, and choosing particular instrumentation to incorporate emotion or fear for the different layers.

Genre knob 430 allows a user to select a particular genre for artist inspiration tool 340 to overlay onto the musical composition. For example, the user may say "Generate a jazz inspired track." In another example, the user may add a genre inspiration knob selection to other inspiration knob selections, such as "Generate a Taylor Swift inspired track with a fearful emotion and jazz genre." In this example, artist inspiration tool 340 combines musical characteristics corresponding to Taylor Swift's musical signature with musical characteristics corresponding to a fearful emotion and musical characteristics corresponding to a Jazz genre.

Theme knob 440 allows a user to select a particular theme for artist inspiration tool 340 and overlay a particular ambience onto the musical composition, such as a Western theme, an Arabic theme, a 1920's theme, etc. As discussed above, the user may request just a theme inspiration knob selection or may add the theme inspiration knob selection to other inspiration knob selections.

Structure knob 450 allows the user to select a particular structure of the musical composition for artist inspiration tool 340 to overlay onto the musical composition. In one embodiment, the structure selection may be a simple bass, rhythm, and melody or the structure selection may be a complex bass, rhythm, and melody (see FIG. 5 and corresponding text for further details).

FIG. 5 is an exemplary diagram depicting musical characteristics corresponding to inspiration knob selections that the artist inspiration tool utilizes to configure a reward structure of the artist inspiration tool's reinforcement learning model.

Table 500 shows examples of inspiration knobs in column 510. The inspiration knobs may be pre-determined by artist inspiration tool 340 or they may be dynamic in nature based on a user's request. In one embodiment, the user's request may not correlate with any of inspiration knobs shown in column 510 and, in this embodiment, knowledge manager 100 accesses a computer network to identify musical characteristics corresponding to the user's request. For example, the user may request a musical composition based on all of the number 1 songs in the past 8 weeks. In this example, knowledge manager 100 may analyze each of the number 1 songs in the past 8 weeks to determine similar musical characteristics of the songs.

Column 520 includes a list of inspiration knob selections corresponding to the inspiration knobs shown in column 510. The inspiration knob selections may be a pre-determined list or may be based on a learning process from analyzing a corpora of documents or songs. Column 530 includes a list of musical characteristics corresponding to the inspiration knob selections in column 520. Again, the musical characteristics may be predetermined or they may be based on a learning process from analyzing a corpora of documents or songs. For example, knowledge manager 100 may analyze music theory documentation to associate musical characteristics with the inspiration knob selections. In turn, artist inspiration tool 340 uses the musical characteristics to configure the reward structure of reinforcement learning model 350 (see FIGS. 8, 11, and corresponding text for further details).

Figure 6:
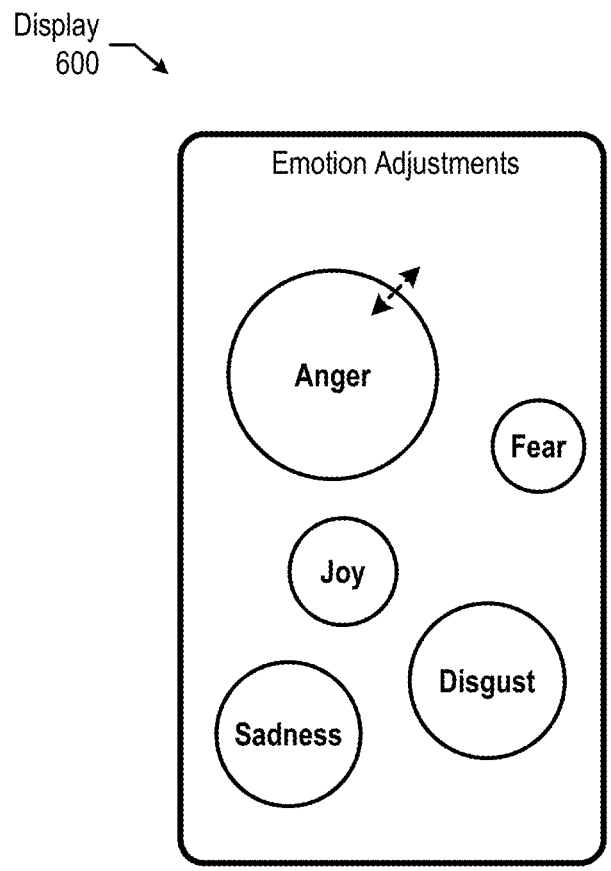
FIG. 6 is an exemplary diagram showing a user interface that allows a user to adjust an amount of various emotion types to utilize when creating a new musical composition.

FIG. 6 is an exemplary diagram showing a user interface that allows a user to adjust an amount of various emotion types to utilize when creating a new musical composition. In one example, a user may provide an artist musical signature knob selection to artist inspiration tool 340, such as "Tupac." In this example, artist inspiration tool 340 analyzes songs corresponding to the selected artist to identify the songs' moods.

Artist inspiration tool 340 then provides a graphical display (display 600) that displays emotion objects whose size is proportional to the type of emotion in the artist's corresponding songs. In one embodiment, the emotion of an existing song may be determined by feeding in the lyrics through a sentiment analysis/emotion recognition tool. In another embodiment, knowledge manager 100 may crawl the Internet and determine people's reactions and feelings about an artist's particular song.

The example in FIG. 6 shows that Tupac's songs include emotions such as anger, fear, joy, sadness, and disgust, with the anger emotion being the most prevalent. The user views display 600 and then may adjust the amount of one or more of the emotion types. For example, the user may increase or decrease the anger emotion object to instill more or less anger emotion onto a new musical composition. In turn, artist inspiration tool 340 adjusts the musical characteristics loaded into reinforcement learning model 350 based on the adjusted emotion objects to update reinforcement learning model 350's reward structure and, in turn, generates a new musical composition.

Figure 7:
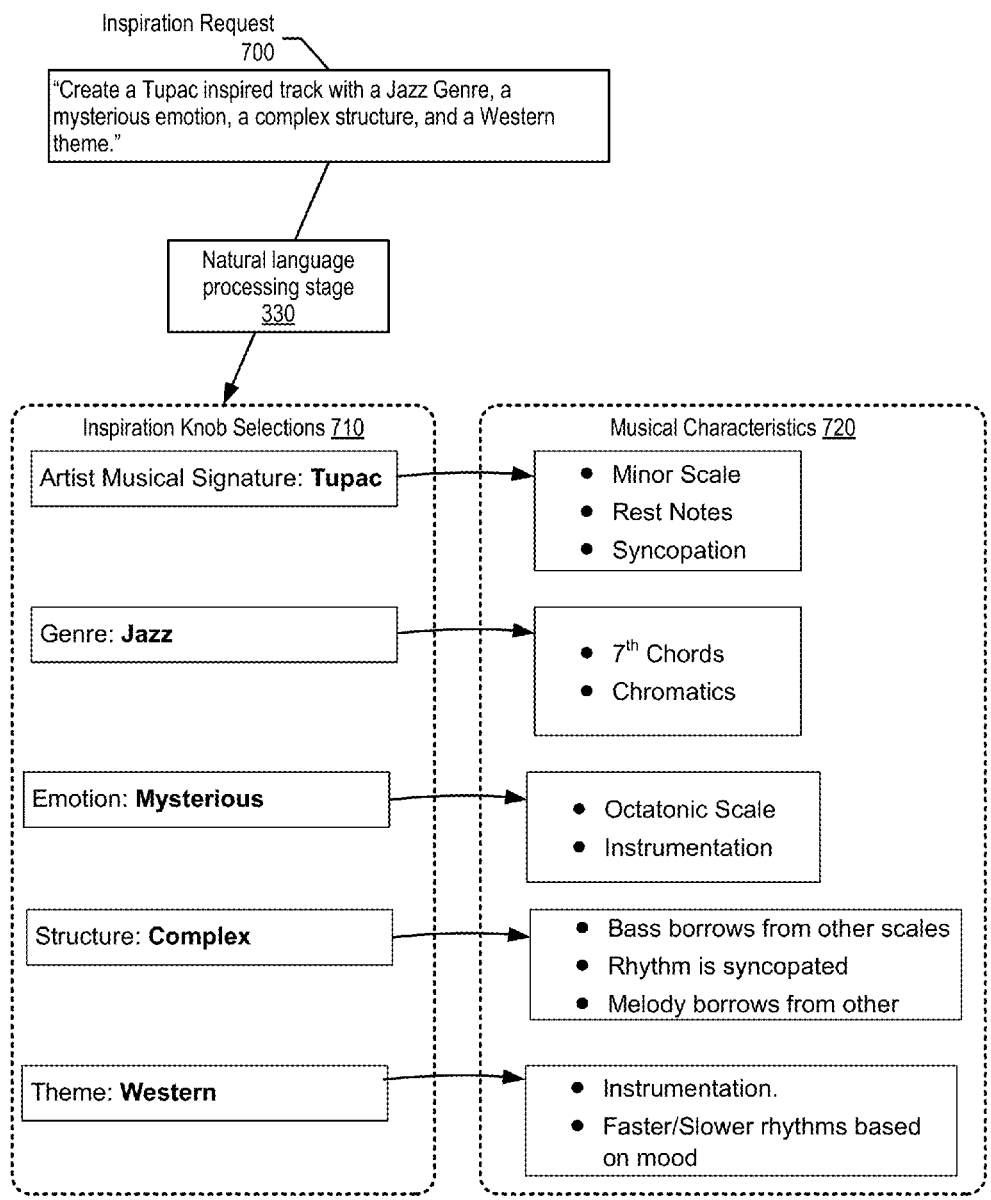
FIG. 7 is an exemplary diagram depicting a knowledge manager and artist inspiration tool transforming a user's inspiration request to musical characteristics.

FIG. 7 is an exemplary diagram depicting a knowledge manager and artist inspiration tool transforming a user's inspiration request to musical characteristics, which are utilized by the artist inspiration tool to create a musical composition. User 300 speaks inspiration request 700 to the user's information handling system, such as a cell phone. Natural language processing stage 330 extracts inspiration knob selections 710 from inspiration request 700, which include Tupac, Jazz, Mysterious, Complex, and Western. In turn, artist inspiration tool 340 determines (e.g., retrieves from knowledge base 106) musical characteristics 720 that correspond to inspiration knobs 710.

Artist inspiration tool 340 then loads musical characteristics 720 into reinforcement learning model 350 to configure its reward structure accordingly. In one embodiment, if conflicts exist between musical characteristics corresponding to different inspiration knob selections, artist inspiration tool 340 will select between conflicting musical characteristics to load into reinforcement learning model 350. For example, if a user selects Taylor swift (no syncopation) with complex structure (syncopation), artist inspiration tool 340 may use the no syncopation musical characteristic from the Taylor Swift inspiration knob selection, but will use other complex knob's corresponding musical characteristics such as chromatics, neighbor tones, etc.

FIG. 8 is an exemplary diagram depicting the artist inspiration tool's reinforcement learning model, which iteratively generates a musical composition based on musical characteristics.

Reinforcement learning differs from standard supervised learning in that supervised learning provides correct input/output pairs, while reinforcement learning does not provide correct input/output pairs. Instead, reinforcement learning depends upon a reward structure that involves finding a balance between exploration of uncharted territory and exploitation of current knowledge. Reinforcement learning model 350 includes composer agent 800 and environment 810. Reinforcement learning model 350 uses a set of environment states 850 (s(t)), a set of actions 840 (a(t)); and a set of rewards 860 r(t) corresponding to the set of actions 840.

Artist inspiration tool 340 receives inspiration knob selections such as from natural language processing stage 330. Artist inspiration tool 340 then retrieves musical characteristics 830 from knowledge base 106 as discussed herein and configures the reward structure of environment 810 using musical characteristics 820. Composer agent 800 then interacts with environment 810 in discrete time steps to iteratively generate a musical composition. At each time "t," composer agent 800 chooses an action a(t) from a set of available actions (e.g., shown in table 865), which is sent to environment 810. Environment 810 moves to a new state s(t+1) and provides a reward 860 associated with the transition, which depends on the state and the action. The goal of a composer agent 800 is to collect as much reward as possible. In one embodiment, composer agent 800 does not always choose an action with a highest immediate reward, but rather will choose an action that will maximize a cumulative long term reward.

Table 860 shows actions and corresponding rewards received from environment 810 based on the assumptions corresponding to reward structure shown in table 855. As can be seen from table 865, high credit is assigned to an action playing a home note G, whereas high blame is assigned to an action playing a neighbor tone because of the simple structure inspiration knob selection. Composer agent 800 may then choose any next action as a function of the history or randomize its action selection.

Figure 9:
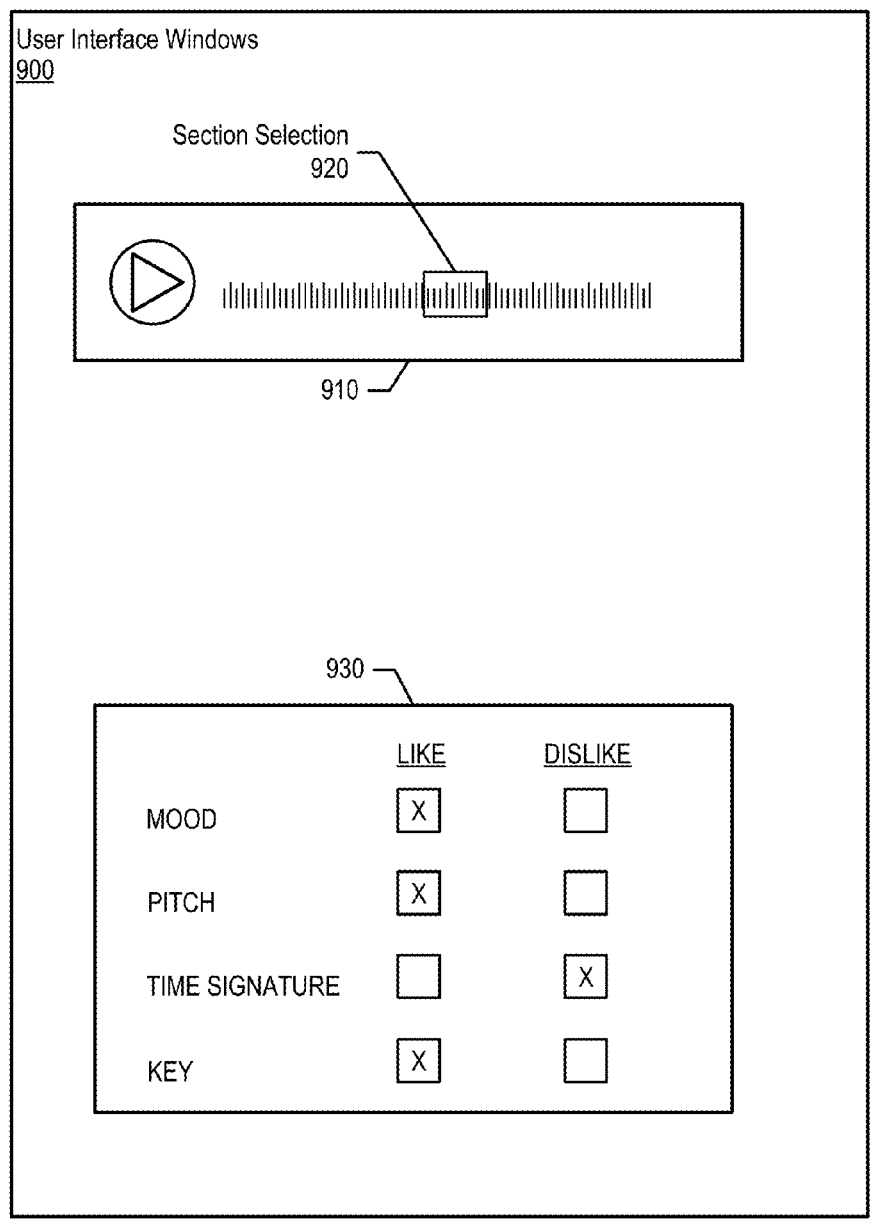
FIG. 9 is an exemplary diagram depicting various user interface windows that allows a user to provide feedback of generated musical composition to an artist inspiration tool.

FIG. 9 is an exemplary diagram depicting various user interface windows that allows a user to provide feedback of generated musical composition to artist inspiration tool 340.

User interface window 910 allows a user to select a section of a musical composition and provide feedback for the selected section. Section selection 920 may be a musical measure or user selectable in size. For example, user 300 may stretch section selection 920 to encompass the chorus of a musical composition and provide feedback for the chorus using, for example, user interface window 930. User 300 may also utilize user interface window 930 to provide for the entire musical composition. As discussed herein, artist inspiration tool 340 receives the user feedback and adjusts the reward structure of reinforcement learning model 350 accordingly and generates a new musical composition (see FIG. 11 and corresponding text for further details).

FIG. 10 is an exemplary diagram depicting a user interface window that allows a user to rank various musical compositions. When artist inspiration tool 340 has provided several musical compositions to user 300, artist inspiration tool 340 may allow user 300 to rank the musical compositions against each other. This allows user 300 the opportunity to identify the best musical composition of the generated musical compositions and also gives artist inspiration tool 340 an opportunity to glean insight into user 300's preferences.

Display 1000 shows several musical compositions from "Track A" to "Track H." The user may move one or more of the musical compositions up or down in order based on user 300's likes and dislikes. In one embodiment, user 300 may select and rank sections of the musical compositions, such as Track C, chorus." In this embodiment, artist inspiration tool 340 identifies the top ranked sections of the musical compositions and may adjust the reward structure of reinforcement learning model 350 to possibly create another musical composition using the adjusted reinforcement learning model.

Figure 11:
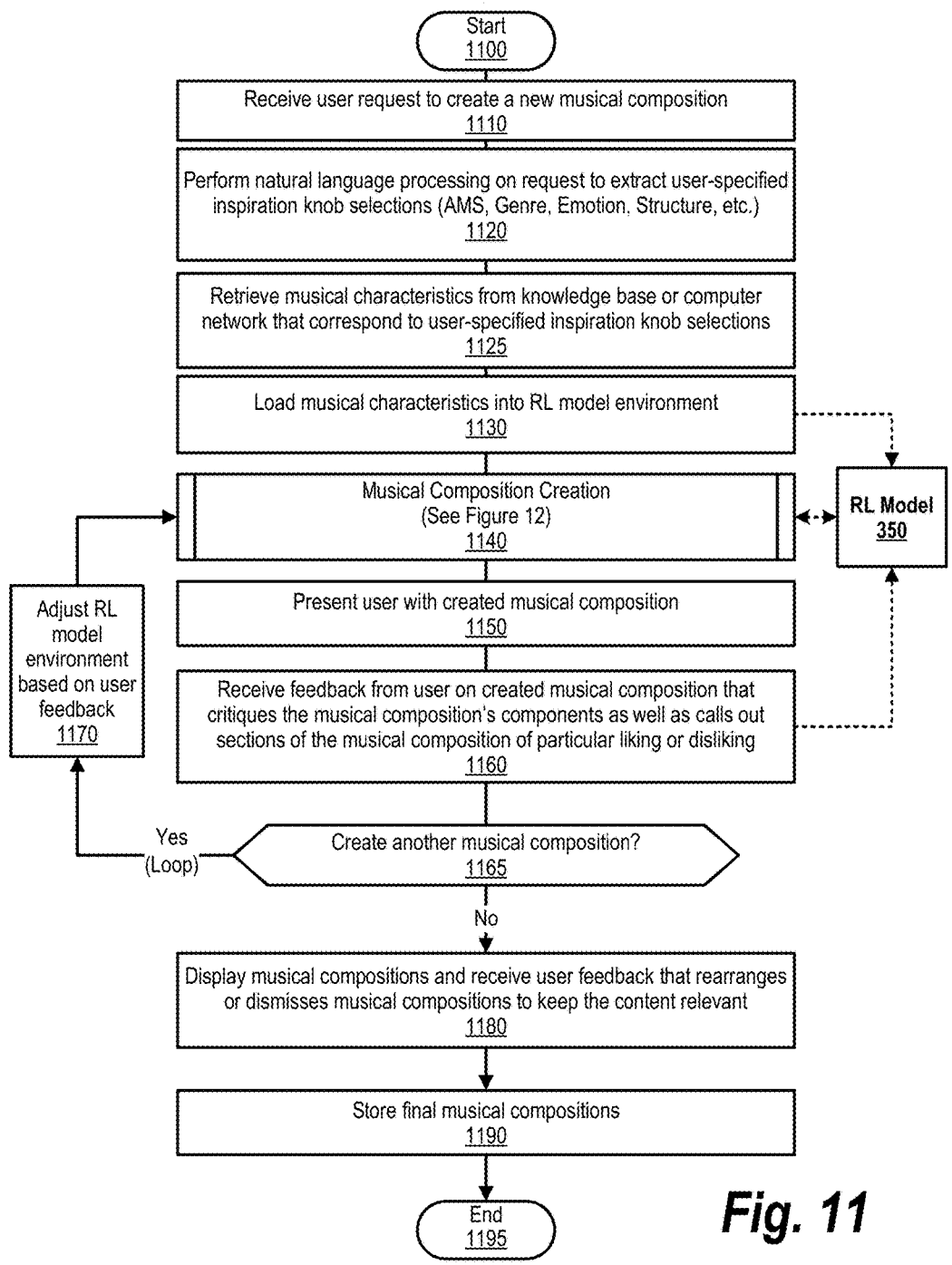
FIG. 11 is an exemplary high-level flowchart depicting steps taken to generate musical compositions based on a user's inspiration request and feedback.

FIG. 11 is an exemplary high-level flowchart depicting steps taken to generate musical compositions based on a user's inspiration request and feedback. FIG. 11 processing commences at 1100 whereupon, at step 1110, the process receives a user request to create a new musical composition, such as inspiration request 310 shown in FIG. 3. At step 1120, the process performs natural language processing on the request to extract user-specified inspiration knob selections (AMS, Genre, Emotion, Structure, etc.). Referring to FIG. 7, natural language processing stage 330 may extract various musical characteristics from inspiration request 700.

At step 1125, the process retrieves musical characteristics from knowledge base 106 or a computer network that correspond to the user-specified inspiration knob selections. For example, if one of the inspiration knob selections was "wild west movie," the process may analyze corresponding digital presentations, such as musical compositions played in wild west movies and determine their corresponding musical characteristics.

At step 1130, the process loads the musical characteristics into reinforcement model 350's environment. Referring back to FIG. 8, the process loads musical characteristics 820 into environment 810. At predefined process 1140, the process iteratively performs actions based on rewards using reinforcement learning model 350 until reinforcement learning model 350 reaches an empirical threshold, at which point the process produces the musical composition (see FIG. 12 and corresponding text for processing details).

At step 1150, the process presents the user with the created musical composition. The user listens to the musical composition and provides feedback for the entire musical composition and/or sections of the musical composition, such as by using the user interface windows shown in FIG. 9. At step 1160, the process receives feedback from the user on the created musical composition that critiques the musical composition's components and/or indications of sections of the musical composition of particular liking or disliking.

The process determines as to whether to create another musical composition (decision 1165). For example, the user may select a "Create another musical composition" button on the user's display. If the process should create another musical composition, then decision 1165 branches to the 'yes' branch, which loops back to step 1170 and adjusts reinforcement learning model 350's environment based on the user's feedback. For example, user 300 may indicate that user 300 does not like the pitch of a section of the musical composition and artist inspiration tool 300 adjusts the musical characteristics corresponding to the pitch and re-configures reinforcement learning model 350 accordingly. This looping continues until the process is finished creating musical compositions, such as when a user selects "Finished" on the user interface window, at which point decision 1165 branches to the 'no' branch exiting the loop.

At step 1180, the process displays the musical compositions, such as that shown in FIG. 10, and receives user feedback that rearranges or dismisses some of the musical compositions to keep the content relevant. At step 1190, the process stores the final musical compositions, which the user may further enhance, such as by adding lyrics to the musical composition. FIG. 11 processing thereafter ends at 1195.

Figure 12:
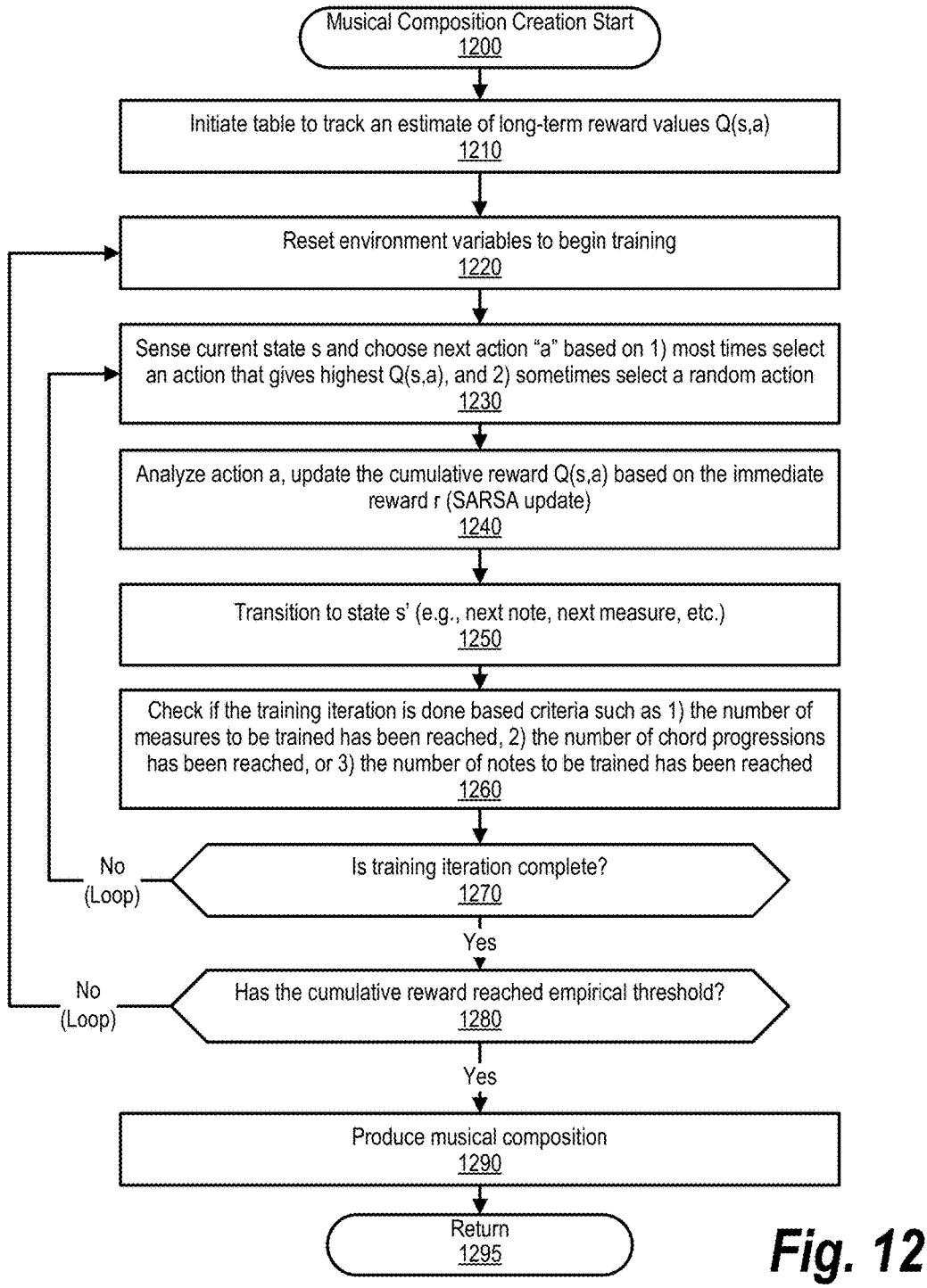
FIG. 12 is an exemplary flowchart depicting steps taken to generate a musical composition based on a reward structure of a reinforcement learning model.

FIG. 12 is an exemplary flowchart depicting steps taken to generate a musical composition based on a reward structure of a reinforcement learning model. FIG. 12 processing commences at 1200 whereupon, at step 1210, the process (e.g., composer agent 800) initiates a table to track an estimate of long-term reward values Q(s,a). At step 1220, the process resets environment variables to begin the training stage.

At step 1230, the process senses a current state "s" and chooses a next action "a." The process selects an action a majority of the time that provides a highest reward Q(s,a), and some of the time the process selects a random action. The goal of the process is to achieve a balance of exploitation (learning what has worked best in the past) and exploration (uncovering different parts of the environment to learn better).

At step 1240, the process analyzes the action a, updates the cumulative reward Q(s,a) based on the immediate reward r (SARSA update) from environment 810. In one embodiment, Q-Learning techniques are utilized to store the Q value of each state and action pair for reinforcement learning model 350. The Q value is an approximation of a long term reward value for each state and action pair and may be stored in a Q value matrix. The process may use other approaches such as temporal difference learning to determine the long term cumulative rewards.

At step 1250, the process transitions to state s' (e.g., next note, next measure, etc.). At step 1260, the process checks if the training iteration is complete based on, in one embodiment, user-specified criteria such as 1) the number of measures to be trained has been reached, 2) the number of chord progressions has been reached, or 3) the number of notes to be trained has been reached.

The process determines as to whether the training iteration is complete (decision 1270). If the training iteration is not complete, then decision 1270 branches to the 'no' branch which loops back to continue the training session. This looping continues until the training iteration is complete, at which point decision 1270 branches to the 'no' branch exiting the loop.

The process determines as to whether the cumulative reward has reached an empirical threshold (decision 1280). In one embodiment, the process empirically determines a threshold and determines a point at which to stop training. The empirical threshold may be based on multiple factors such as (a) when considering the rules using music theory, the output follows these rules, (b) when the RL model has reached a point in learning when the increase in the long term reward becomes incrementally small, (c) empirically the reinforcement learning model has determined how many iterations to perform for the user to like a particular output. In one embodiment, the process stops training after a certain number of iterations for performance reasons.

If the cumulative reward has not reached the empirical threshold, then decision 1280 branches to the 'no' branch which loops back to reset the environment variables and continue training. In one embodiment, the process does not reset the Q matrix and utilizes the information already gained from previous iterations. This looping continues until the cumulative reward reaches the empirical threshold, at which point decision 1280 branches to the 'yes' branch exiting the loop. At step 1290, the process produces the musical composition, such as by combining the actions taken in steps 1230-1270, and FIG. 12 processing thereafter returns to the calling routine (see FIG. 11) at 1295.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    configuring a reinforcement learning model based on one or more inspiration selections received from a user, wherein the configuring comprises loading one or more musical characteristics corresponding to the one or more inspiration selections into an environment of the reinforcement learning model;
    performing a plurality of training iterations using the configured reinforcement learning model wherein, during the plurality of training iterations, the reinforcement learning model generates a plurality of actions and a plurality of rewards corresponding to the plurality of actions based on the one or more musical characteristics loaded into the environment; and
    generating a musical composition based on the plurality of actions in response to determining that the plurality of rewards reach an empirical threshold.

2. The method of claim 1 wherein at least one of the one or more inspiration selections is an emotion selection, the method further comprising:
    prior to the generation of the musical composition:
        identifying the one or more musical characteristics corresponding to the emotion selection, wherein at least one of the one or more musical characteristics incorporates an emotion overtone onto the musical composition; and
        loading the one or more musical characteristics into the environment of the reinforcement learning model, wherein the environment generates the plurality of rewards based on the one or more musical characteristics.

3. The method of claim 1 wherein at least one of the one or more inspiration selections is an artist musical signature selection, the method further comprising:
    prior to the generation of the musical composition:
        identifying an artist corresponding to the artist musical signature selection;
        identifying the one or more musical characteristics of one or more songs corresponding to the identified artist; and
        loading the one or more musical characteristics into the environment of the reinforcement learning model, wherein the environment generates the plurality of rewards based on the one or more musical characteristics.

4. The method of claim 3 further comprising:
    determining one or more emotion characteristics of the one or more previous songs;
    displaying one or more emotion objects to the user on a display, each of the one or more emotion objects corresponding to one of the one or more emotion characteristics;
    receiving at least one emotion object adjustment from the user that adjusts a size of at least one of the one or more emotion objects;
    adjusting at least one of the one or more musical characteristics based on the emotion object adjustment; and
    loading the at least one adjusted musical characteristic into the environment to adjust a reward structure of the environment that generates the plurality of rewards.

5. The method of claim 1 wherein at least one of the one or more inspiration selections is structure selection, the method further comprising:
    identifying the one or more musical characteristics corresponding to the structure selection, wherein at least one of the one or more musical characteristics correspond to a melody of the musical composition; and
    loading the one or more musical characteristics into the environment of the reinforcement learning model, wherein the environment generates the plurality of rewards based on the one or more musical characteristics.

6. The method of claim 1 wherein at least one of the one or more inspiration selections is theme selection, the method further comprising:
    identifying the one or more musical characteristics of an ambience corresponding to the theme selection; and
    loading the one or more musical characteristics into the environment of the reinforcement learning model, wherein the environment generates the plurality of rewards based on the one or more musical characteristics.

7. The method of claim 6 wherein the identifying of the one or more musical characteristics further comprises:
    analyzing one or more compositions of one or more digital presentations corresponding to the theme selection, wherein the analyzing results in the determining of the one or more musical characteristics.

8. The method of claim 1 wherein the one or more inspiration selections include a first inspiration selection and a second inspiration selection, the method further comprising:
    determining one or more first musical characteristics corresponding to the first inspiration selection;
    determining one or more second musical characteristics corresponding to the second inspiration selection; and
    loading both the one or more first musical characteristics and the one or more second musical characteristics into the environment of the reinforcement learning model, wherein the environment generates the plurality of rewards based on both the one or more first musical characteristics and the one or more second musical characteristics.

9. The method of claim 1 further comprising:
receiving feedback from the user subsequent to the user listening to the musical composition;
re-configuring the reinforcement learning model based on the feedback; and
generating a subsequent musical composition using the reconfigured reinforcement learning model.

10. The method of claim 9 wherein the feedback corresponds to a selected section from a plurality of sections included in the musical composition.

11. The method of claim 9 further comprising:
providing the musical composition and the subsequent musical composition in a ranked order on a display;
receiving ranking feedback from the user;
providing the musical composition and the subsequent musical composition in a different ranked order on a display based on the ranking feedback; and
adjusting a reward structure of the reinforcement learning model based on the ranking feedback.

12. An information handling system comprising:
one or more processors;
a memory coupled to at least one of the processors;
a set of computer program instructions stored in the memory and executed by at least one of the processors in order to perform actions of:
configuring a reinforcement learning model based on one or more inspiration selections received from a user, wherein the configuring comprises loading one or more musical characteristics corresponding to the one or more inspiration selections into an environment of the reinforcement learning model;
performing a plurality of training iterations using the configured reinforcement learning model wherein, during the plurality of training iterations, the reinforcement learning model generates a plurality of actions and a plurality of rewards corresponding to the plurality of actions based on the one or more musical characteristics loaded into the environment; and
generating a musical composition based on the plurality of actions in response to determining that the plurality of rewards reach an empirical threshold.

13. The information handling system of claim 12 wherein at least one of the one or more inspiration selections is an emotion selection, and wherein the processors perform additional actions comprising:
prior to the generation of the musical composition:
identifying the one or more musical characteristics corresponding to the emotion selection, wherein at least one of the one or more musical characteristics incorporates an emotion overtone onto the musical composition; and
loading the one or more musical characteristics into the environment of the reinforcement learning model, wherein the environment generates the plurality of rewards based on the one or more musical characteristics.

14. The information handling system of claim 12 wherein at least one of the one or more inspiration selections is an artist musical signature selection, and wherein the processors perform additional actions comprising:
prior to the generation of the musical composition:
identifying an artist corresponding to the artist musical signature selection;
identifying the one or more musical characteristics of one or more songs corresponding to the identified artist; and
loading the one or more musical characteristics into the environment of the reinforcement learning model, wherein the environment generates the plurality of rewards based on the one or more musical characteristics.

15. The information handling system of claim 12 wherein at least one of the one or more inspiration selections is structure selection, and wherein the processors perform additional actions comprising:
identifying the one or more musical characteristics corresponding to the structure selection, wherein at least one of the one or more musical characteristics correspond to a melody of the musical composition; and
loading the one or more musical characteristics into the environment of the reinforcement learning model, wherein the environment generates the plurality of rewards based on the one or more musical characteristics.

16. The information handling system of claim 12 wherein the one or more inspiration selections include a first inspiration selection and a second inspiration selection, and wherein the processors perform additional actions comprising:
determining one or more first musical characteristics corresponding to the first inspiration selection;
determining one or more second musical characteristics corresponding to the second inspiration selection; and
loading both the one or more first musical characteristics and the one or more second musical characteristics into the environment of the reinforcement learning model, wherein the environment generates the plurality of rewards based on both the one or more first musical characteristics and the one or more second musical characteristics.

17. The information handling system of claim 12 wherein the processors perform additional actions comprising:
receiving feedback from the user subsequent to the user listening to the musical composition;
re-configuring the reinforcement learning model based on the feedback; and
generating a subsequent musical composition using the reconfigured reinforcement learning model.

18. A computer program product stored in a computer readable storage medium, comprising computer program code that, when executed by an information handling system, causes the information handling system to perform actions comprising:
configuring a reinforcement learning model based on one or more inspiration selections received from a user, wherein the configuring comprises loading one or more musical characteristics corresponding to the one or more inspiration selections into an environment of the reinforcement learning model;
performing a plurality of training iterations using the configured reinforcement learning model wherein, during the plurality of training iterations, the reinforcement learning model generates a plurality of actions and a plurality of rewards corresponding to the plurality of actions based on the one or more musical characteristics loaded into the environment; and generating a musical composition based on the plurality of actions in response to determining that the plurality of rewards reach an empirical threshold.

19. The computer program product of claim 18 wherein at least one of the one or more inspiration selections is an emotion selection, and wherein the information handling system performs additional actions comprising:
prior to the generation of the musical composition:
identifying the one or more musical characteristics corresponding to the emotion selection, wherein at least one of the one or more musical characteristics incorporates an emotion overtone onto the musical composition; and
loading the one or more musical characteristics into the environment of the reinforcement learning model, wherein the environment generates the plurality of rewards based on the one or more musical characteristics.

20. The computer program product of claim 18 wherein at least one of the one or more inspiration selections is an artist musical signature selection, and wherein the information handling system performs additional actions comprising:
prior to the generation of the musical composition:
identifying an artist corresponding to the artist musical signature selection;
identifying the one or more musical characteristics of one or more songs corresponding to the identified artist; and
loading the one or more musical characteristics into the environment of the reinforcement learning model, wherein the environment generates the plurality of rewards based on the one or more musical characteristics.

21. The computer program product of claim 18 wherein at least one of the one or more inspiration selections is structure selection, and wherein the information handling system performs additional actions comprising:
identifying the one or more musical characteristics corresponding to the structure selection, wherein at least one of the one or more musical characteristics correspond to a melody of the musical composition; and
loading the one or more musical characteristics into the environment of the reinforcement learning model, wherein the environment generates the plurality of rewards based on the one or more musical characteristics.

22. The computer program product of claim 18 wherein the one or more inspiration selections include a first inspiration selection and a second inspiration selection, and wherein the information handling system performs additional actions comprising:
determining one or more first musical characteristics corresponding to the first inspiration selection;
determining one or more second musical characteristics corresponding to the second inspiration selection; and
loading both the one or more first musical characteristics and the one or more second musical characteristics into the environment of the reinforcement learning model, wherein the environment generates the plurality of rewards based on both the one or more first musical characteristics and the one or more second musical characteristics.

23. The computer program product of claim 18 wherein the information handling system performs additional actions comprising:
receiving feedback from the user subsequent to the user listening to the musical composition;
re-configuring the reinforcement learning model based on the feedback; and
generating a subsequent musical composition using the reconfigured reinforcement learning model.

24. A method implemented by an information handling system that includes a memory and a processor, the method comprising:
receiving a request from a user that includes an emotion selection that selects one of a plurality of emotions;
identifying one or more musical characteristics that correspond to the selected emotion, wherein at least one of the musical characteristics is major chord selection;
configuring a reward structure of an environment in a reinforcement learning model by loading the one or more musical characteristics into the environment;
performing a plurality of training iterations using the reinforcement learning model, wherein each of the plurality of iterations provides a selected one of a plurality of actions to the environment and the environment generates one of a plurality of rewards based on the selected action and the configured reward structure corresponding to the loaded one or more musical characteristics; and
generating a musical composition based on the plurality of actions in response to determining that the plurality of rewards reach an empirical threshold.

25. A method implemented by an information handling system that includes a memory and a processor, the method comprising:
receiving a request from a user that includes a structure selection selected from the group consisting of a simple structure and a complex structure;
identifying one or more musical characteristics that correspond to the structure selection, wherein at least one of the musical characteristics is a rhythm selection;
configuring a reward structure of an environment in a reinforcement learning model by loading the one or more musical characteristics into the environment;
performing a plurality of training iterations using the reinforcement learning model, wherein each of the plurality of iterations provides a selected one of a plurality of actions to the environment and the environment generates one of a plurality of rewards based on the selected action and the configured reward structure corresponding to the loaded one or more musical characteristics; and
generating a musical composition based on the plurality of actions in response to determining that the plurality of rewards reach an empirical threshold.

* * * * *